US007963358B2

(12) United States Patent
Buell et al.

(10) Patent No.: US 7,963,358 B2
(45) Date of Patent: Jun. 21, 2011

(54) MOTORCYCLE FRAME HAVING INTEGRAL FUEL TANK AND AIRBOX

(75) Inventors: Erik F. Buell, Mukwonago, WI (US); Steven H. Anderson, Williams Bay, WI (US); Edward A. Weston, Cary, IL (US); Edward M. Laben, Mukwonago, WI (US)

(73) Assignee: Buell Motorcycle Company, East Troy, WI (US)

( * ) Notice: Subject to any disclaimer, the term of this patent is extended or adjusted under 35 U.S.C. 154(b) by 224 days.

(21) Appl. No.: 11/772,502

(22) Filed: Jul. 2, 2007

(65) Prior Publication Data
US 2009/0008178 A1 Jan. 8, 2009

(51) Int. Cl.
*B62K 11/08* (2006.01)
(52) U.S. Cl. .................. 180/225; 180/68.1; 280/833
(58) Field of Classification Search .................. 180/225, 180/68.1–68.3, 219, 291; 280/833, 834
See application file for complete search history.

(56) References Cited

U.S. PATENT DOCUMENTS

| 4,484,651 A | 11/1984 | Hattori et al. | |
| 4,951,774 A * | 8/1990 | Buell | 180/225 |
| 6,105,701 A * | 8/2000 | Buell | 180/229 |
| 6,484,837 B1 | 11/2002 | Buell et al. | |
| 7,380,624 B2 * | 6/2008 | Momosaki | 180/68.3 |
| 7,441,619 B2 * | 10/2008 | Hatakeyama | 180/68.3 |
| 2003/0006579 A1 * | 1/2003 | Buell et al. | 280/279 |
| 2004/0050357 A1 * | 3/2004 | Idei et al. | 123/198 E |
| 2005/0051375 A1 * | 3/2005 | Momosaki | 180/219 |
| 2007/0272198 A1 * | 11/2007 | Domergue | 123/198 E |
| 2008/0282654 A1 * | 11/2008 | Matschl et al. | 55/385.3 |
| 2008/0314669 A1 * | 12/2008 | Buell | 180/219 |

FOREIGN PATENT DOCUMENTS
WO  WO 2006/119459  11/2006
* cited by examiner

*Primary Examiner* — Kevin Hurley
*Assistant Examiner* — Tashiana Adams
(74) *Attorney, Agent, or Firm* — Michael Best & Friedrich LLP

(57) ABSTRACT

The present invention provides a motorcycle including a frame having a forward portion and a rearward portion. The forward portion includes a steering head. The motorcycle also includes an engine coupled to the frame and a steering assembly pivotably coupled to the steering head. The steering assembly includes a fork and a front wheel rotatably coupled to the fork. The motorcycle further includes a swing arm pivotably coupled to the rearward portion, a rear wheel rotatably coupled to the swing arm, and a first cavity defined in the frame. The first cavity is in fluid communication with the engine to provide fuel to the engine. The motorcycle also includes a second cavity defined in the frame. The second cavity is in fluid communication with the engine to provide combustion air to the engine.

19 Claims, 7 Drawing Sheets

MOTORCYCLE FRAME HAVING INTEGRAL FUEL TANK AND AIRBOX

FIELD OF THE INVENTION

The present invention relates to motorcycles, and more particularly to motorcycle frames.

BACKGROUND OF THE INVENTION

Conventional motorcycles typically include a frame, an engine coupled to the frame, and a separate fuel tank coupled to the frame by a plurality of fasteners. Such motorcycle frames are typically made from metal tubing and include one or more flanges to which the fuel tank is coupled. Motorcycles having carbureted engines typically include one or more air cleaners directly mounted to the carburetors to provide a filtered airflow to the engine, while motorcycles having fuel-injected engines typically include an airbox coupled to the frame in a manner similar to the fuel tank. Such an airbox may include an air filter to provide a filtered airflow to the engine.

SUMMARY OF THE INVENTION

The present invention provides, in one aspect, a motorcycle including a frame having a forward portion and a rearward portion. The forward portion includes a steering head. The motorcycle also includes an engine coupled to the frame and a steering assembly pivotably coupled to the steering head. The steering assembly includes a fork and a front wheel rotatably coupled to the fork. The motorcycle further includes a swing arm pivotally coupled to the rearward portion, a rear wheel rotatably coupled to the swing arm, and a first cavity defined in the frame. The first cavity is in fluid communication with the engine to provide fuel to the engine. The motorcycle also includes a second cavity defined in the frame. The second cavity is in fluid communication with the engine to provide combustion air to the engine.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
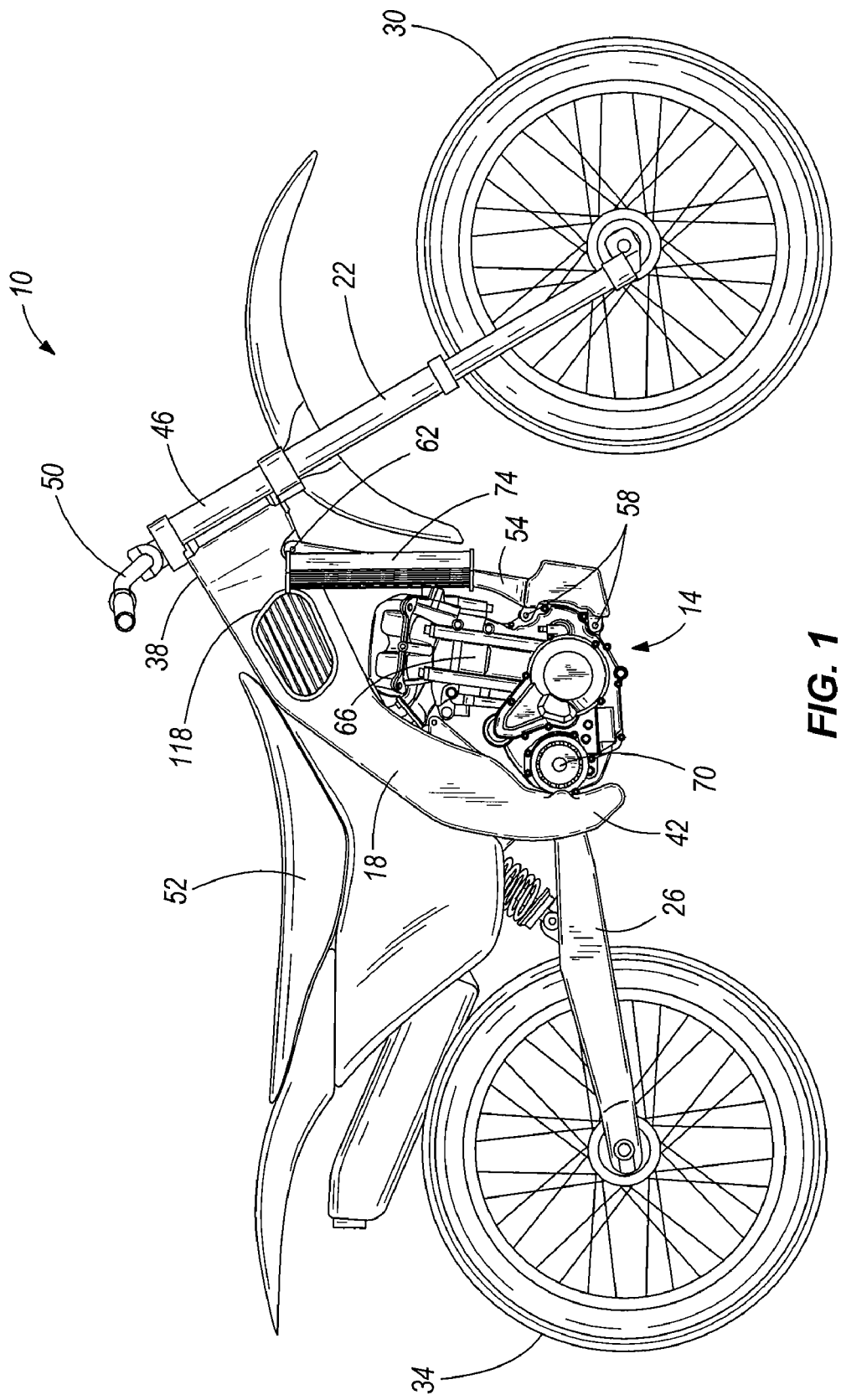
FIG. 1 is a side view of a motorcycle embodying the present invention.

FIG. 1 illustrates a motorcycle 10 including a drive assembly 14, a frame 18, a steering assembly or a front fork assembly 22, a swing arm or rear fork assembly 26, a front wheel 30, and a rear wheel 34. The frame 18 supports the drive assembly 14, the front fork assembly 22 at a forward portion 38 of the frame 18, and the rear fork assembly 26 at a rearward portion 42 of the frame 18. The front fork assembly 22 is pivotally supported within a steering head 46 in the forward portion 38 of the frame 18 (see FIG. 2) and supports the front wheel 30. The front fork assembly 22 includes a pair of handle bars 50 for steering the motorcycle 10. The rear fork assembly 26 is coupled to the rearward portion 42 of the frame 18 and rotatably supports the rear wheel 34. The motorcycle 10 also includes a seat 52 upon which one or more riders may be supported.

With reference to FIG. 1, the drive assembly 14 is coupled to the frame 18 between the front wheel 30 and the rear wheel 34 of the motorcycle 10. Specifically, the rear of the drive assembly 14 is pivotally coupled to the frame 18 and the front of the drive assembly 14 is coupled to the frame 18 via a support member 54. In the illustrated construction of the motorcycle 10, the bottom of the support member 54 is directly coupled to the drive assembly 14 by a plurality of fasteners 58 (e.g., bolts) while the top of the support member 54 is coupled to the frame 18 by a single fastener 62 (e.g., a bolt or a quick-release fastener) to facilitate disconnection of the support member 54 from the frame 18 during maintenance to the drive assembly 14. Therefore, to service the drive assembly 14, one would only be required to disconnect the single fastener 62 connecting the top of the support member 54 and the frame 18 to allow the drive assembly 14 to pivot downwardly, thereby improving access to the drive assembly 14 for maintenance.

With continued reference to FIG. 1, the drive assembly 14 includes an engine 66 and a transmission 70, which comprise distinct, independent components of the drive assembly 14. In the illustrated construction of the motorcycle 10, the engine 66 is a single-cylinder engine 66. Alternatively, the engine 66 may be configured to include two or more cylinders. A heat exchanger 74 configured to cool engine oil, coolant, or both is coupled to the support member 54 toward the forward portion 38 of the frame 18 and pivots downwardly with the drive assembly 14 during maintenance to the drive assembly 14, as discussed above.

Figure 2:
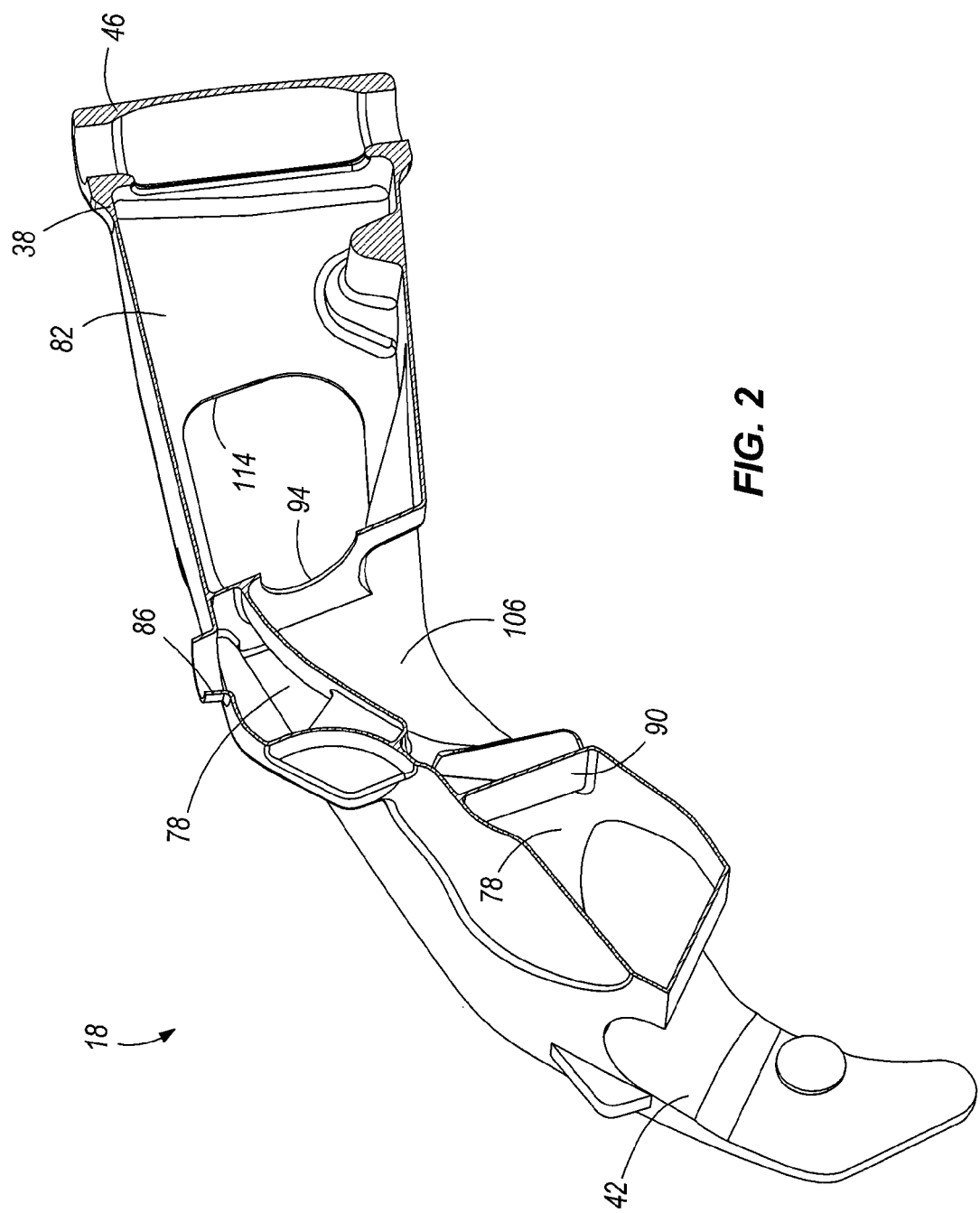
FIG. 2 is a perspective cutaway view of a frame of the motorcycle of FIG. 1, illustrating a fuel-containing cavity and a combustion air-containing cavity defined in the frame.

With reference to FIG. 2, the frame 18 includes both a fuel-containing cavity 78 and a combustion air-containing cavity 82. The fuel-containing cavity 78 is situated adjacent the rearward portion 42 of the frame 18. The frame 18 also includes a fuel filler port 86 in fluid communication with the fuel-containing cavity 78 through which fuel is pumped into the fuel-containing cavity 78. In the illustrated construction of the frame 18, the frame 18 includes a tunnel 90 around which the fuel-containing cavity 78 is formed. Alternatively, the frame 18 may be configured in any of a number of different ways to yield a differently-shaped fuel-containing cavity. The fuel-containing cavity 78 is in fluid communication with the engine 66 to provide fuel to the engine 66. Although not shown in the drawings, the frame 18 includes a fuel outlet port in fluid communication with the fuel-containing cavity 78. A fuel supply assembly (e.g., a fuel pump, fuel line, fuel filter, etc.) may be coupled to the fuel outlet port to transfer fuel in the fuel-containing cavity 78 to the engine 66.

Figure 3:
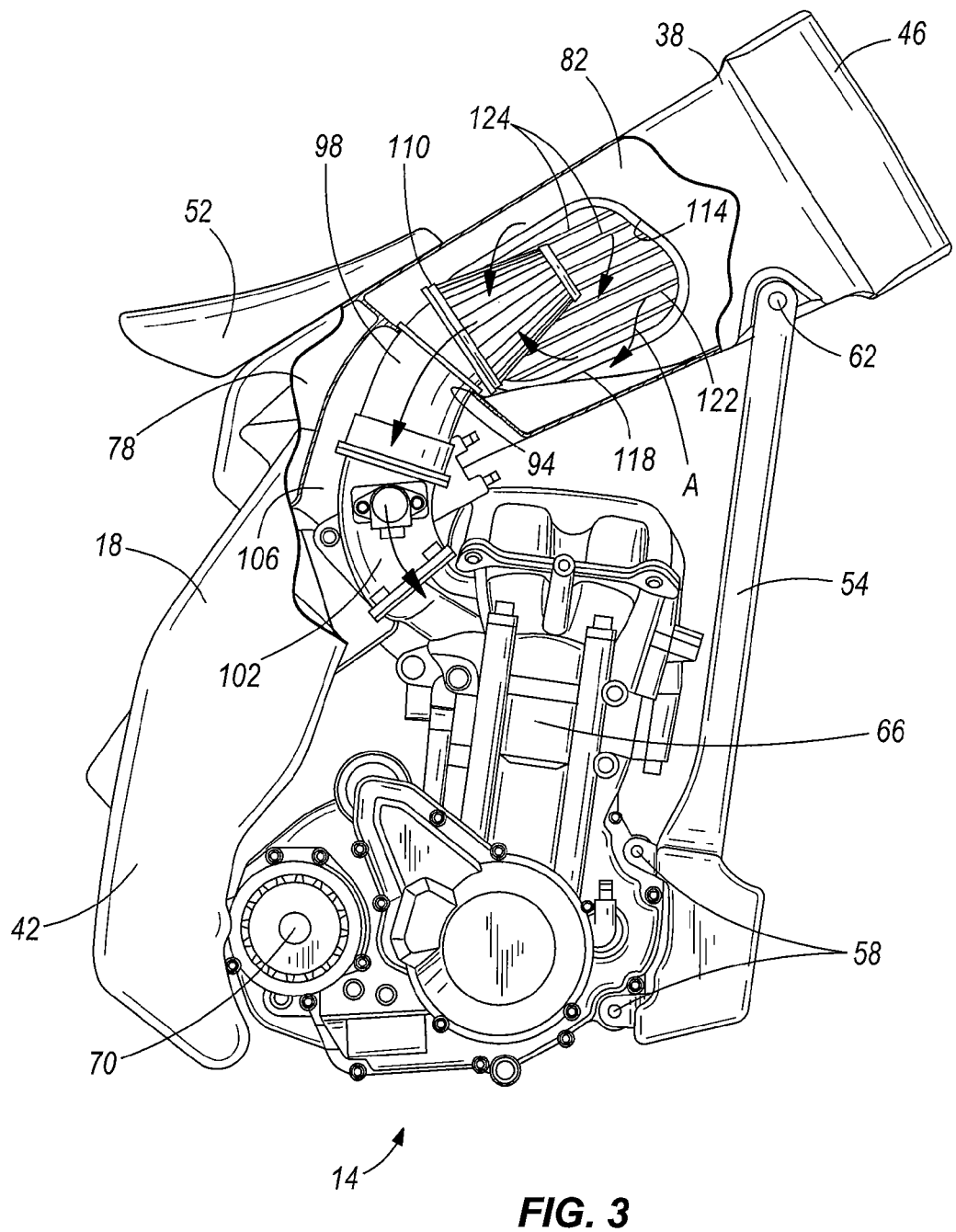
FIG. 3 is a side, partial cutaway view of the frame of the motorcycle of FIG. 1, illustrating a first airbox configuration of the combustion air-containing cavity of the frame.

With continued reference to FIG. 2, the combustion air-containing cavity 82 is situated adjacent the forward portion 38 of the frame 18. The frame 18 also includes a combustion air outlet 94 port in fluid communication with the cavity 82 positioned at the rear of the cavity 82. With reference to FIG. 3, the air outlet port 94 is configured to receive an inlet elbow 98, which, in turn, is coupled to a throttle member 102 coupled to the engine 66. In the illustrated construction of the motorcycle 10, the engine 66 is fuel-injected and the throttle member 102 is configured as a throttle body for metering the amount of airflow delivered to the engine 66. However, in an alternative construction of the motorcycle 10, the engine 66 may be carbureted and the throttle member 102 may be configured as a carburetor for metering the amount of fuel and airflow delivered to the engine 66.

With reference to FIG. 2, the frame 18 includes another cavity 106, situated between the fuel-containing cavity 78 and the combustion air-containing cavity 82, in which the throttle member 102 and the inlet elbow 98 are at least partially positioned (see also FIGS. 3-7).

With reference to FIG. 3, a first airbox configuration of the combustion air-containing cavity 82 is shown. In this configuration, a conical air filter 110 is positioned within the cavity 82 and is coupled to the inlet elbow 98 to provide a filtered airflow to the engine 66. The frame 18 includes an access port 114 on each side of the frame 18 through which the air filter 110 may be removed when it is necessary to replace or clean the air filter 110 (only a single access port 114 is shown). Respective covers 118 are coupled to the frame 18 to block access to the air filter 110 and the cavity 82 during normal operation of the motorcycle 10. Alternatively, the frame 18 may include only a single access port 114 on one side of the frame 18 to access the air filter 110 and a single cover 118 blocking access to the cavity 82 during normal operation of the motorcycle 10. The covers 118 may be made from a plastic material, and may include integral structure (e.g., resilient tabs) to facilitate connection to the frame 18. Alternatively, the covers 118 may be fastened to the frame 18 using conventional hardware, or the covers 118 may alternatively be made from other materials.

In the airbox configuration of the cavity 82 shown in FIG. 3, combustion air is allowed to enter the cavity 82 via at least one inlet port 122 in the cover 118. In the illustrated construction of the cover 118, a series of louvers 124 allows combustion air to be drawn into the cavity 82 while substantially preventing liquid or other debris from entering the cavity 82 during operation of the motorcycle 10. As such, during operation of the engine 66, combustion air (represented by arrow A) is drawn through the louvers 124 in the cover 118 (i.e., through the side of the frame 18) into the cavity 82, through the air filter 110, and through the inlet elbow 98 and throttle member 102. Alternatively, one or both of the covers 118 may include a single inlet port 122 configured as a "scoop" to allow combustion air to enter the cavity 82 during operation of the motorcycle 10. Also, only one of the covers 118 may include the at least one inlet port 122, and the other may be solid to block entry of combustion air and debris into the cavity 82 during operation of the motorcycle 10.

Figure 4:
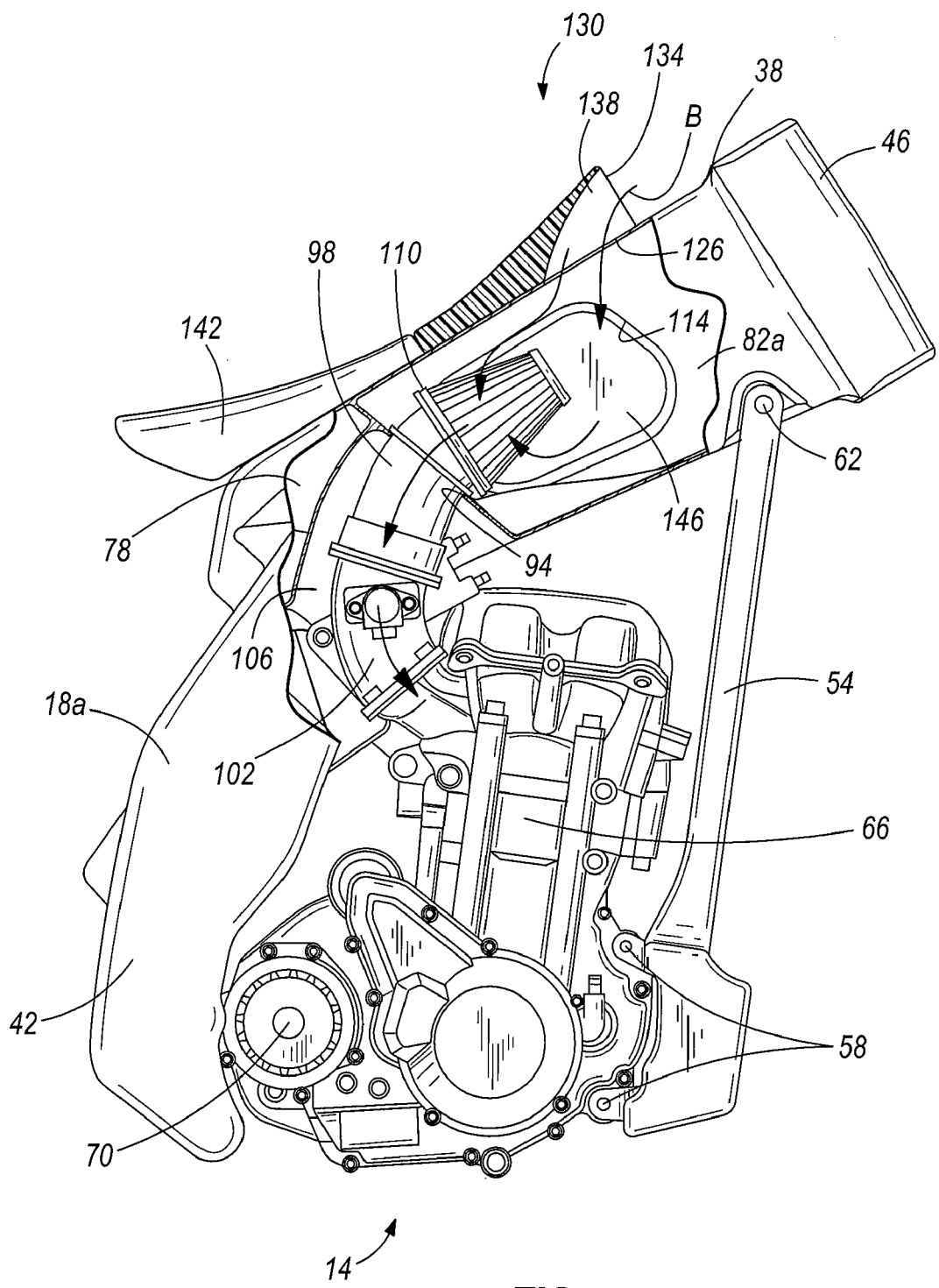
FIG. 4 is a side, partial cutaway view of an alternative construction of the frame of the motorcycle of FIG. 1, illustrating a second airbox configuration of the combustion air-containing cavity of the frame.

With reference to FIG. 4, a second airbox configuration of the combustion air-containing cavity 82a is shown. Like components are labeled with like reference numerals. Components modified to accommodate the second airbox configuration are additionally labeled with the character "a" to differentiate the modified components from those incorporated in the other airbox configurations disclosed herein. Like the configuration of FIG. 3, the airbox configuration of FIG. 4 incorporates a conical air filter 110 positioned within the cavity 82a and coupled to the inlet elbow 98 to provide a filtered airflow to the engine 66. However, rather than allowing combustion air to enter the cavity 82a via at least one inlet port 122 in the cover 118 as in the airbox configuration of FIG. 3, the airbox configuration of FIG. 4 incorporates an air inlet port 126 in the top of the frame 18a through which combustion air is drawn into the cavity 82a. Also, in this configuration, the motorcycle 10a may include a cover 130 coupled to the top of the frame 18a that at least partially overlies the air inlet port 126 in the top of the frame 18a. The cover 130 may include an air inlet port 134 and a combustion air passageway 138 communicating the air inlet port 134 in the cover 130 with the air inlet port 126 in the top of the frame 18a. As such, during operation of the engine 66, combustion air (represented by arrow B) is drawn through the air inlet port 134 in the cover 130, through the passageway 138 in the cover 130, through the air inlet port 126 in the frame 18a (i.e., through the top of the frame 18a) into the cavity 82a, through the air filter 110, and through the inlet elbow 98 and throttle member 102.

In the illustrated construction of the motorcycle 10a, the cover 130 extends substantially along the entire length of the frame 18a, and includes a seat portion 142 upon which a rider may sit while operating the motorcycle 10a. The cover 130 may include integral structure (e.g., resilient tabs) to facilitate connection to the frame 18a. Alternatively, the cover 130 may be coupled to the frame 18a using conventional or quick-release hardware. The cover 130 may be made from a plastic material, with the exception of the seat portion 142, which may be made from a composition of foam and other materials to provide comfort to the rider of the motorcycle 10a. Alternatively, the cover 130 may be separated into a distinct seat and a distinct cover for the inlet port 126 in the frame 18a.

In addition, in the airbox configuration of FIG. 4, respective covers 146 are coupled to the sides of the frame 18a (only one of which is shown) to block access to the air filter 110 and the cavity 82a during operation of the motorcycle 10a. Because combustion air is allowed to enter the cavity 82a through the air inlet port 126 in the top of the frame 18a, the respective covers 146 on the sides of the frame 18a may be solid to substantially prevent airflow, liquid, and other debris from entering the cavity 82a through the access ports 114. Like the covers 118 shown in FIG. 3, the covers 146 may be made from a plastic material, and may include integral structure (e.g., resilient tabs) to facilitate connection to the frame 18a. Alternatively, the covers 146 may be fastened to the frame 18a using conventional hardware, or the covers 146 may alternatively be made from other materials.

Figure 5:
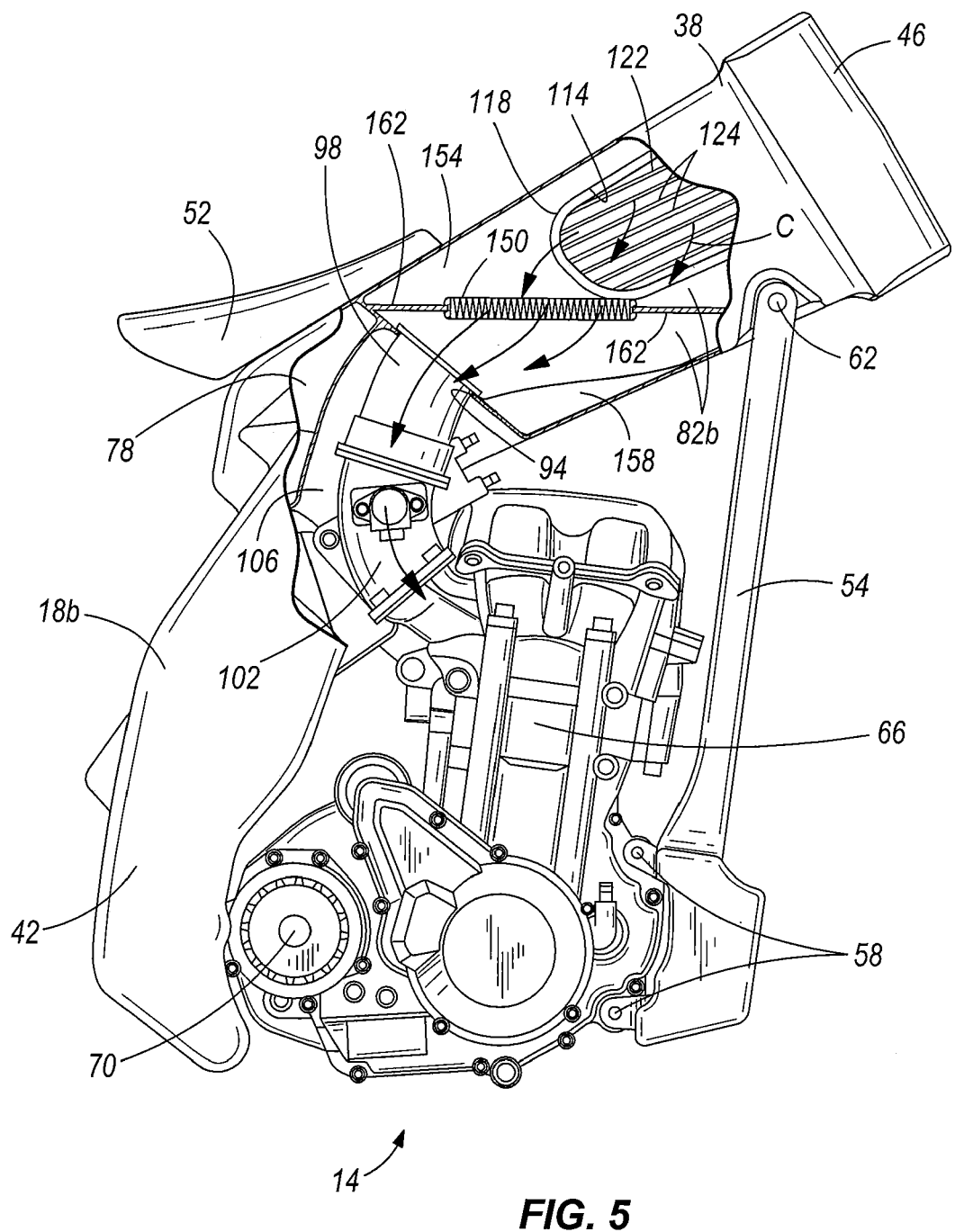
FIG. 5 is a side, partial cutaway view of another alternative construction of the frame of the motorcycle of FIG. 1, illustrating a third airbox configuration of the combustion air-containing cavity of the frame.

With reference to FIG. 5, a third airbox configuration of the combustion air-containing cavity 82b is shown. Like components are labeled with like reference numerals, and components modified to accommodate the third airbox configuration are additionally labeled with the character "b" to differentiate the modified components from those incorporated in the other airbox configurations disclosed herein. Rather than using the conical air filter 110, this airbox configuration utilizes a flat-panel air filter 150 positioned within the cavity 82b. As shown in FIG. 5, the flat-panel air filter 150 is oriented substantially horizontally with the ground when the motorcycle 10b is situated on flat ground. As such, the air filter 150 at least partially separates the cavity 82b into a first portion 154 containing unfiltered combustion air and a second portion 158 containing filtered combustion air. Additional wall structure 162 may be incorporated into the cavity 82b to support the air filter 150 and to separate the filtered combustion air from the unfiltered combustion air.

Like the airbox configuration shown in FIG. 3, respective covers 118 are coupled to the frame 18b to block access to the air filter 150 and the cavity 82b via the access ports 114 during operation of the motorcycle 10b. In the airbox configuration shown in FIG. 5, however, unfiltered combustion air is only allowed to enter the first portion 154 of the cavity 82b because the louvers 124 in the covers 118 correspond only with the first portion 154 of the cavity 82b. The louvers 124 in the covers 118 allow combustion air to be drawn into the first portion 154 of the cavity 82b while providing a tortuous path that substantially prevents liquid or other debris from entering the first portion 154 of the cavity 82b during operation of the motorcycle 10b. As such, during operation of the engine 66, combustion air (represented by arrow C) is drawn through the louvers 124 in the covers 118 (i.e., through the side of the frame 18b) into the first portion 154 of the cavity 82b, through the air filter 150 and into the second portion 158 of the cavity 82b, and through the inlet elbow 98 and throttle member 102. As shown in FIG. 5, the access ports 114 are repositioned on the frame 18b, with respect to the positions shown in FIGS. 3 and 4, to provide access to the first portion 154 of the cavity 82b only. Alternatively, the position of the access ports 114 in the frame 18b may be the same as that shown in the frames 18, 18a of FIGS. 3 and 4, respectively, and the louvers 124 or other inlet ports may be formed in the portion of the covers 118 corresponding only with the first portion 154 of the cavity 82b.

Figure 6:
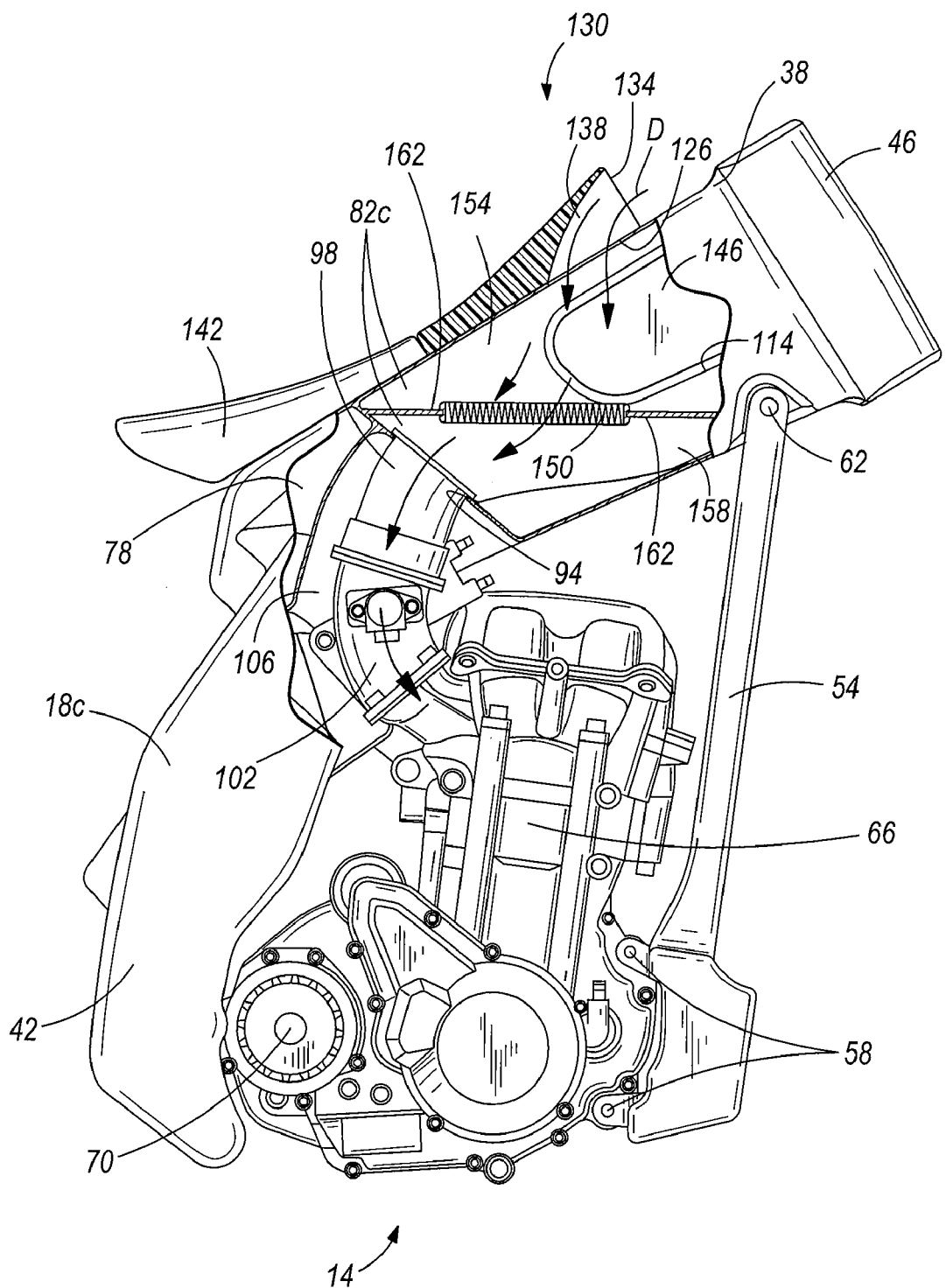
FIG. 6 is a side, partial cutaway view of yet another alternative construction of the frame of the motorcycle of FIG. 1, illustrating a fourth airbox configuration of the combustion air-containing cavity of the frame.

With reference to FIG. 6, a fourth airbox configuration of the combustion air-containing cavity 82c is shown. Like components are labeled with like reference numerals, and components modified to accommodate the fourth airbox configuration are additionally labeled with the character "c" to differentiate the modified components from those incorporated in the other airbox configurations disclosed herein. Like the configuration of FIG. 5, the airbox configuration of FIG. 6 incorporates a flat-panel air filter 150 positioned within the cavity 82c to provide a filtered airflow to the engine 66. However, rather than allowing combustion air to enter the first portion 154 of the cavity 82b via at least one inlet port 122 in the cover 118 as in the airbox configuration of FIG. 5, the airbox configuration of FIG. 6 incorporates the air inlet port 126 in the top of the frame 18c (similar to that shown in FIG. 4) through which combustion air is drawn into the first portion 154 of the cavity 82c. As such, during operation of the engine 66, combustion air (represented by arrow D) is drawn through the air inlet port 134 in the cover 130, through the passageway 138 in the cover 130, through the air inlet port 126 in the frame 18c (i.e., through the top of the frame 18c) into the first portion 154 of the cavity 82c, through the air filter 150 and into the second portion 158 of the cavity 82c, and through the inlet elbow 98 and throttle member 102.

Figure 7:
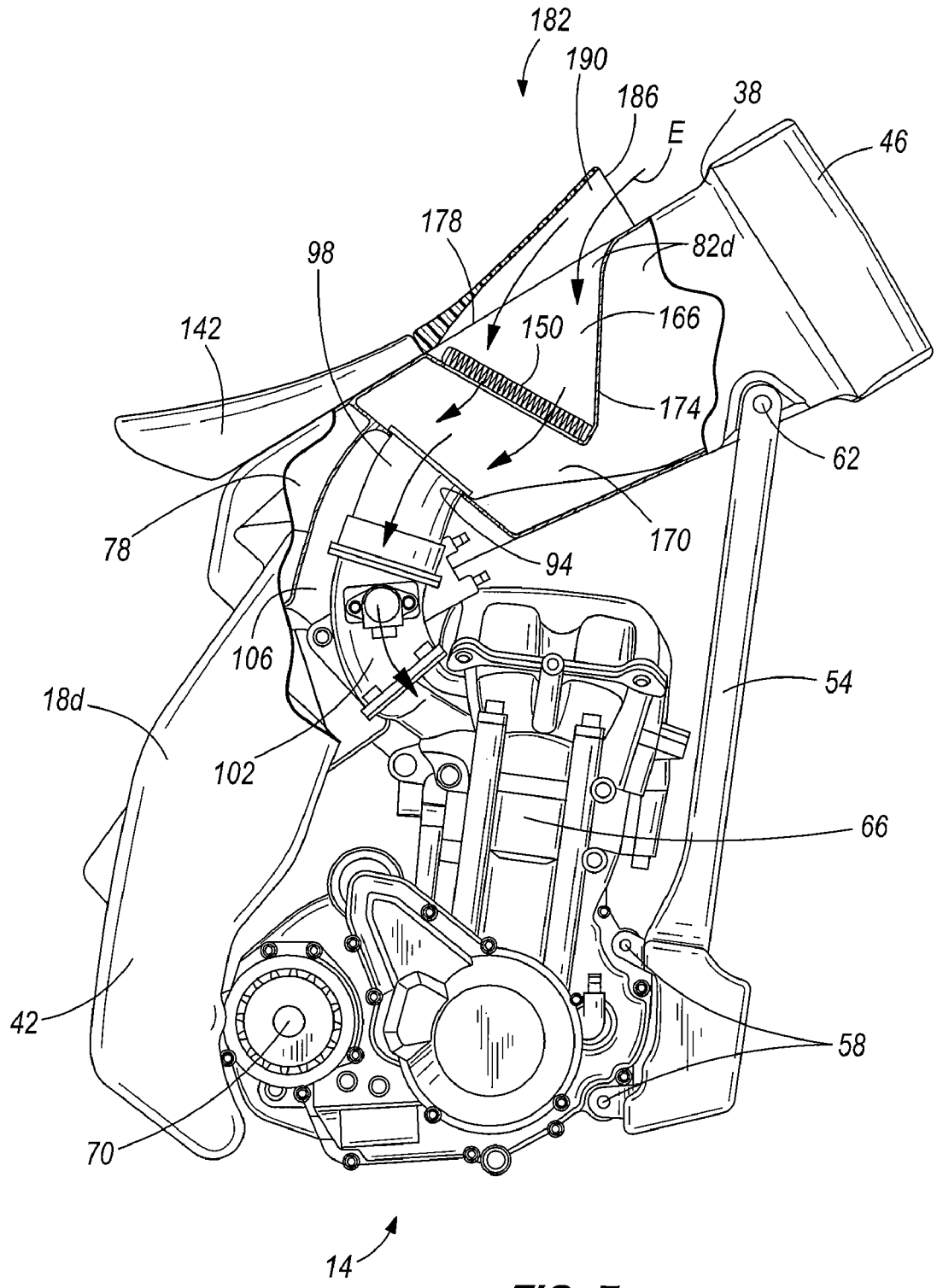
FIG. 7 is a side, partial cutaway view of another alternative construction of the frame of the motorcycle of FIG. 1, illustrating a fifth airbox configuration of the combustion air-containing cavity of the frame.

With reference to FIG. 7, a fifth airbox configuration of the combustion air-containing cavity 82d is shown. Like components are labeled with like reference numerals, and components modified to accommodate the fifth airbox configuration are additionally labeled with the character "d" to differentiate the modified components from those incorporated in the other airbox configurations disclosed herein. Like the configurations of FIGS. 5 and 6, the airbox configuration of FIG. 7 incorporates a flat-panel air filter 150 positioned within the cavity 82d to provide a filtered airflow to the engine 66. However, the air filter 150 in the configuration of FIG. 7 has a substantially upright or oblique orientation with respect to the ground when the motorcycle 10d is situated on flat ground. As such, the air filter 150 at least partially separates the cavity into a first portion 166 containing unfiltered combustion air and a second portion 170 containing filtered combustion air. Additional wall structure 174 may be incorporated into the cavity 82d to support the air filter 150 and to separate the filtered combustion air from the unfiltered combustion air.

The configuration of FIG. 7 also incorporates an air inlet port 178 in the top of the frame 18d through which combustion air is drawn into the first portion 166 of the cavity 82d. Unlike the air inlet ports 126 shown in FIGS. 4 and 6, the air inlet port 178 shown in FIG. 7 is large enough to access the air filter 150 through the top of the frame 18d for replacement or cleaning. As a result, the access ports 114, the respective covers 118 on the sides of the frame 18, 18b in the airbox configurations of FIGS. 3 and 5, or the respective covers 146 on the sides of the frame 18a, 18c in the airbox configurations of FIGS. 4 and 6 may be omitted in the airbox configuration of FIG. 7.

A cover 182 similar to the cover 130 utilized in the airbox configurations of FIGS. 4 and 6 may be utilized in the airbox configuration of FIG. 7. The cover 182 may include an air inlet port 186 and a combustion air passageway 190 communicating the air inlet port 186 in the cover 182 with the air inlet port 178 in the top of the frame 18d. The cover 182 may be coupled to the frame 18d by quick-disconnect fasteners or other quick-release hardware to facilitate removal of the cover 182 to access the air filter 150 for replacement or cleaning. During operation of the engine 66, combustion air (represented by arrow E) is drawn through the air inlet port 186 in the cover 182, through the passageway 190 in the cover 182, through the air inlet port 178 in the frame 18d (i.e., through the top of the frame 18d) into the first portion 166 of the cavity 82d, through the air filter 150 and into the second portion 170 of the cavity 82d, and through the inlet elbow 98 and throttle member 102.

Any of the frames 18-18d shown in FIGS. 1-7 may be manufactured using an ablation casting process, like that disclosed in U.S. Pat. No. 7,216,691, the entire contents of which is incorporated herein by reference. Such a casting process would allow the frame 18-18d to be made from materials (e.g., 7000-series Aluminum alloys) that ordinarily do not yield desirable castings when using more conventional casting methods and techniques. Alternatively, the frame 18-18d may be manufactured using other casting methods and techniques.

Various features of the invention are set forth in the following claims.

What is claimed is:

1. A motorcycle comprising:
a frame having a forward portion and a rearward portion, the forward portion having a steering head;

an engine coupled to the frame;
a steering assembly pivotably coupled to the steering head, the steering assembly having a fork and a front wheel rotatably coupled to the fork;
a swing arm pivotably coupled to the rearward portion;
a rear wheel rotatably coupled to the swing arm;
a first cavity defined in the frame, the first cavity in fluid communication with the engine to provide fuel to the engine;
a second cavity defined in the frame, the second cavity in fluid communication with the engine to provide combustion air to the engine;
an air filter positioned within the second cavity, the air filter configured to provide a filtered airflow to the engine; and
a cover coupled to the frame, wherein the second cavity is at least partially defined by the frame and the cover.

2. The motorcycle of claim 1, wherein the second cavity includes a first portion upstream of the filter and a second portion downstream of the filter, and wherein the first portion of the second cavity is at least partially defined by the frame and the cover.

3. The motorcycle of claim 1, wherein the cover includes an air intake passageway in fluid communication with the second cavity.

4. The motorcycle of claim 3, wherein the second cavity includes a first portion upstream of the filter and a second portion downstream of the filter, and wherein the air intake passageway is in fluid communication with the first portion of the second cavity.

5. The motorcycle of claim 1, wherein the frame includes a fuel filler port in fluid communication with the first cavity, and wherein the cover is removable to expose the fuel filler port for refueling.

6. The motorcycle of claim 5, wherein the cover includes a seat portion configured to support an operator of the motorcycle.

7. The motorcycle of claim 1, wherein the frame is integrally cast as a single casting.

8. The motorcycle of claim 1, wherein the frame is made using an ablation casting process.

9. A motorcycle comprising:
a frame having a forward portion and a rearward portion, the forward portion having a steering head;
an engine coupled to the frame;
a steering assembly pivotably coupled to the steering head, the steering assembly having a fork and a front wheel rotatably coupled to the fork;
a swing arm pivotably coupled to the rearward portion;
a rear wheel rotatably coupled to the swing arm;
a first cavity defined in the frame, the first cavity in fluid communication with the engine to provide fuel to the engine;
a second cavity defined in the frame, the second cavity in fluid communication with the engine to provide combustion air to the engine; and
a throttle member coupled to the engine, wherein the frame at least partially defines a third cavity, and wherein the throttle member is at least partially disposed within the third cavity.

10. The motorcycle of claim 9, wherein the third cavity is disposed between the first and second cavities.

11. The motorcycle of claim 9, further comprising an air filter positioned within the second cavity and configured to provide a filtered airflow to the engine.

12. A motorcycle engine and frame assembly comprising:
an engine;
a frame supporting the engine, the frame including
a first cavity in fluid communication with the engine to provide fuel to the engine; and
a second cavity in fluid communication with the engine to provide combustion air to the engine;
wherein the frame includes a third cavity that at least partially receives a throttle member of the engine.

13. The motorcycle engine and frame assembly of claim 12, wherein the frame includes an air intake port in fluid communication with the second cavity.

14. The motorcycle engine and frame assembly of claim 12, wherein the frame includes an access port exposed to the second cavity, wherein the access port allows removal of an air filter positioned within the second cavity.

15. The motorcycle engine and frame assembly of claim 12, wherein the frame includes a fuel filler port in fluid communication with the first cavity.

16. The motorcycle engine and frame assembly of claim 12, wherein the third cavity is disposed between the first and second cavities.

17. The motorcycle engine and frame assembly of claim 12, wherein the frame is integrally cast as a single casting.

18. The motorcycle engine and frame assembly of claim 12, wherein the frame is made using an ablation casting process.

19. The motorcycle engine and frame assembly of claim 12, further comprising an air filter positioned within the second cavity and configured to provide a filtered airflow to the engine.

* * * * *